US012561616B2

(12) United States Patent
Chahal et al.

(10) Patent No.: US 12,561,616 B2
(45) Date of Patent: Feb. 24, 2026

(54) TRAINING LARGE DL MODELS VIA SERVERLESS ARCHITECTURE USING CLOUD STORAGE SERVICES-BASED COMMUNICATION CHANNEL

(71) Applicant: Tata Consultancy Services Limited, Mumbai (IN)

(72) Inventors: Dheeraj Chahal, Pune (IN); Surya Chaitanya Venkata Palepu, Bangalore (IN); Mayank Mishra, Thane West (IN); Ravi Kumar Singh, Pune (IN); Rekha Singhal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 560 days.

(21) Appl. No.: 18/140,219

(22) Filed: Apr. 27, 2023

(65) Prior Publication Data

US 2023/0409967 A1 Dec. 21, 2023

(30) Foreign Application Priority Data

Jun. 15, 2022 (IN) .............................. 202221034375

(51) Int. Cl.
*G06N 20/00* (2019.01)

(52) U.S. Cl.
CPC .................................... *G06N 20/00* (2019.01)

(58) Field of Classification Search
CPC ........ G06N 20/00; G06N 3/045; G06N 3/098; G06N 3/063; G06F 2209/5017; G06F 9/5066
See application file for complete search history.

(56) References Cited

U.S. PATENT DOCUMENTS 11,481,627 B2 * 10/2022 Qiu ....................... G06N 3/0464
11,574,253 B2 * 2/2023 Santos ................... G06N 3/098
(Continued)

FOREIGN PATENT DOCUMENTS

CN 113205128 A 8/2021

OTHER PUBLICATIONS

Jayaram et al., "λ-FL : Serverless Aggregation For Federated Learning," 2022, https://api.semanticscholar.org/CorpusID:246972885, https://www.semanticscholar.org/paper/%CE%BB-FL-%3A-Serverless-Aggregation-For-Federated-Jayaram-"Muthusamy/04b58240f67a6495c46b4874a9521806ab15003d.*
Teerapittayanon et al., "Distributed Deep Neural Networks Over the Cloud, the Edge and End Devices," 2017 IEEE 37th International Conference on Distributed Computing Systems (ICDCS), 2017, pp. 328-339, http://doi.org/10.1109/ICDCS.2017.226, https://ieeexplore.ieee.org/document/7979979.*

(Continued)

*Primary Examiner* — Ryan Barrett
(74) *Attorney, Agent, or Firm* — FINNEGAN, HENDERSON, FARABOW, GARRETT & DUNNER LLP

(57) ABSTRACT

State of the art methods require size of DL model, or its gradients be less than maximum data item size of storage used as a communication channel for model training with serverless platform. Embodiments of the present disclosure provide method and system for training large DL models via serverless architecture using communication channel when the gradients are larger than maximum size of one data item allowed by the channel. Gradients that are generated by each worker during current training instance, are chunked into segments and stored in the communication channel. Corresponding segments of each worker are aggregated by aggregators and stored back. Each of the aggregated corresponding segments are read by each worker to generate an aggregated model to be used during successive training instance. Optimization techniques are used for reading-from (Continued)

and writing-to the channel resulting in significant improvement in performance and cost of training.

15 Claims, 16 Drawing Sheets

(56) References Cited

U.S. PATENT DOCUMENTS

| | | | | |
|---|---|---|---|---|
| 12,093,695 | B2 * | 9/2024 | Kalele | G06F 9/5044 |
| 12,189,717 | B1 * | 1/2025 | Karakus | G06F 9/4881 |
| 2015/0294219 | A1 * | 10/2015 | Krizhevsky | G06N 3/09 |
| | | | | 706/25 |
| 2018/0262402 | A1 * | 9/2018 | Kadav | H04L 41/12 |
| 2019/0244135 | A1 * | 8/2019 | Melamed | G06N 20/00 |
| 2020/0118000 | A1 | 4/2020 | Schmidt et al. | |
| 2021/0201526 | A1 * | 7/2021 | Moloney | G06N 3/084 |
| 2021/0382754 | A1 * | 12/2021 | Nimmagadda | G06N 3/08 |
| 2021/0390405 | A1 * | 12/2021 | Choi | G06F 9/4881 |
| 2022/0027738 | A1 * | 1/2022 | Zang | G06N 3/084 |
| 2022/0092480 | A1 * | 3/2022 | Mahadik | G06N 20/10 |
| 2022/0188688 | A1 * | 6/2022 | Launay | G06F 9/52 |
| 2022/0237448 | A1 * | 7/2022 | Chen | G06F 8/443 |
| 2023/0316087 | A1 * | 10/2023 | Mahajan | G06N 3/098 |
| | | | | 706/25 |
| 2024/0370737 | A1 * | 11/2024 | Larsson | G06F 9/544 |
| 2025/0086461 | A1 * | 3/2025 | Moloney | G06V 10/95 |
| 2025/0156162 | A1 * | 5/2025 | Chen | G06F 9/45558 |

OTHER PUBLICATIONS

Karagiannakos, "Distributed Deep Learning training: Model and Data Parallelism in Tensorflow," Oct. 22, 2020, https://theaisummer.com/distributed-training/.*

Jiang et al., "Towards Demystifying Serverless Machine Learning Training," May 17, 2021, https://arxiv.org/abs/2105.07806.*

Jiang et al., "Towards Demystifying Serverless Machine Learning Training," (2021).

Lao et al., "ATP: In-network Aggregation for Multi-tenant Learning," (2021).

Luo et al., "Parameter Hub: a Rack-Scale Parameter Server for Distributed Deep Neural Network Training," (2018).

Sundkvist, "Efficient serverless resource scheduling for distributed deep learning," (2020).

Witte et al., "An Event-Driven Approach to Serverless Seismic Imaging in the Cloud," (2019).

* cited by examiner

100

300

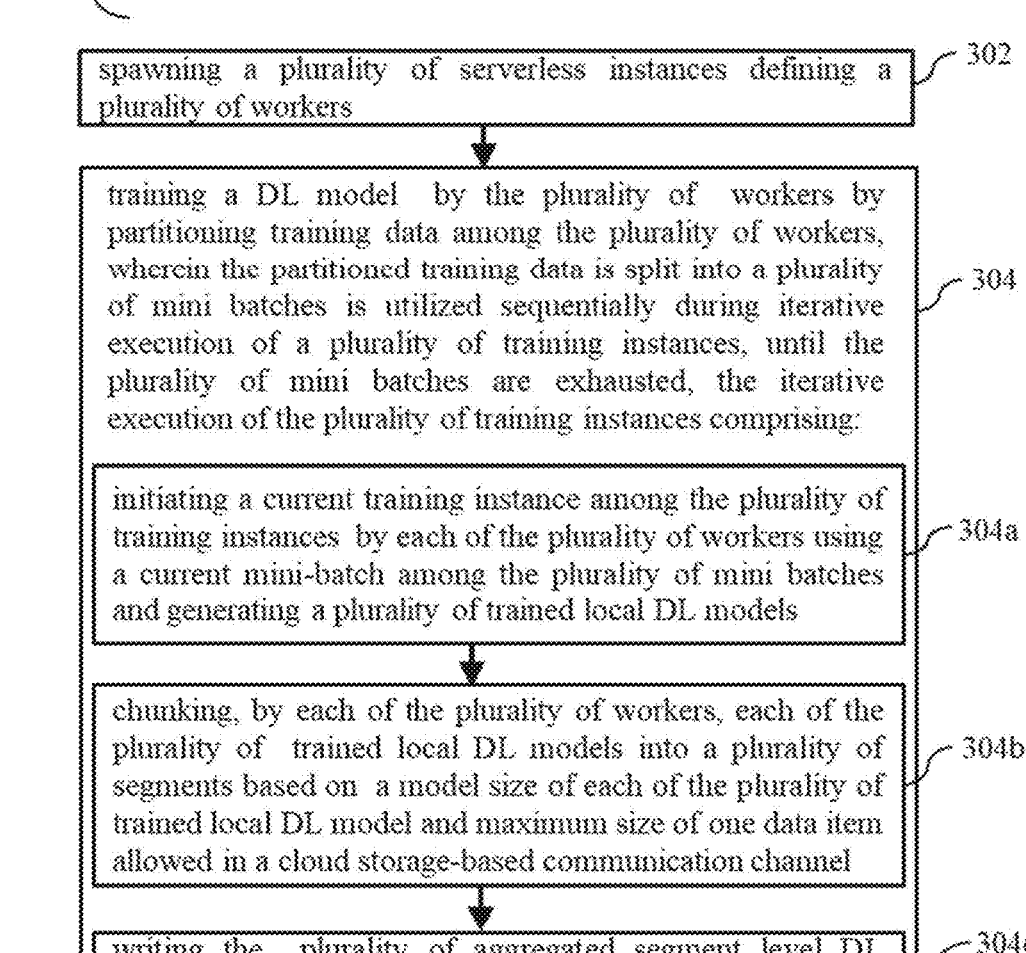

302 spawning a plurality of serverless instances defining a plurality of workers

304 training a DL model by the plurality of workers by partitioning training data among the plurality of workers, wherein the partitioned training data is split into a plurality of mini batches is utilized sequentially during iterative execution of a plurality of training instances, until the plurality of mini batches are exhausted, the iterative execution of the plurality of training instances comprising:

304a initiating a current training instance among the plurality of training instances by each of the plurality of workers using a current mini-batch among the plurality of mini batches and generating a plurality of trained local DL models 304b chunking, by each of the plurality of workers, each of the plurality of trained local DL models into a plurality of segments based on a model size of each of the plurality of trained local DL model and maximum size of one data item allowed in a cloud storage-based communication channel 304c writing the plurality of aggregated segment level DL models into the cloud storage services-based communication channel

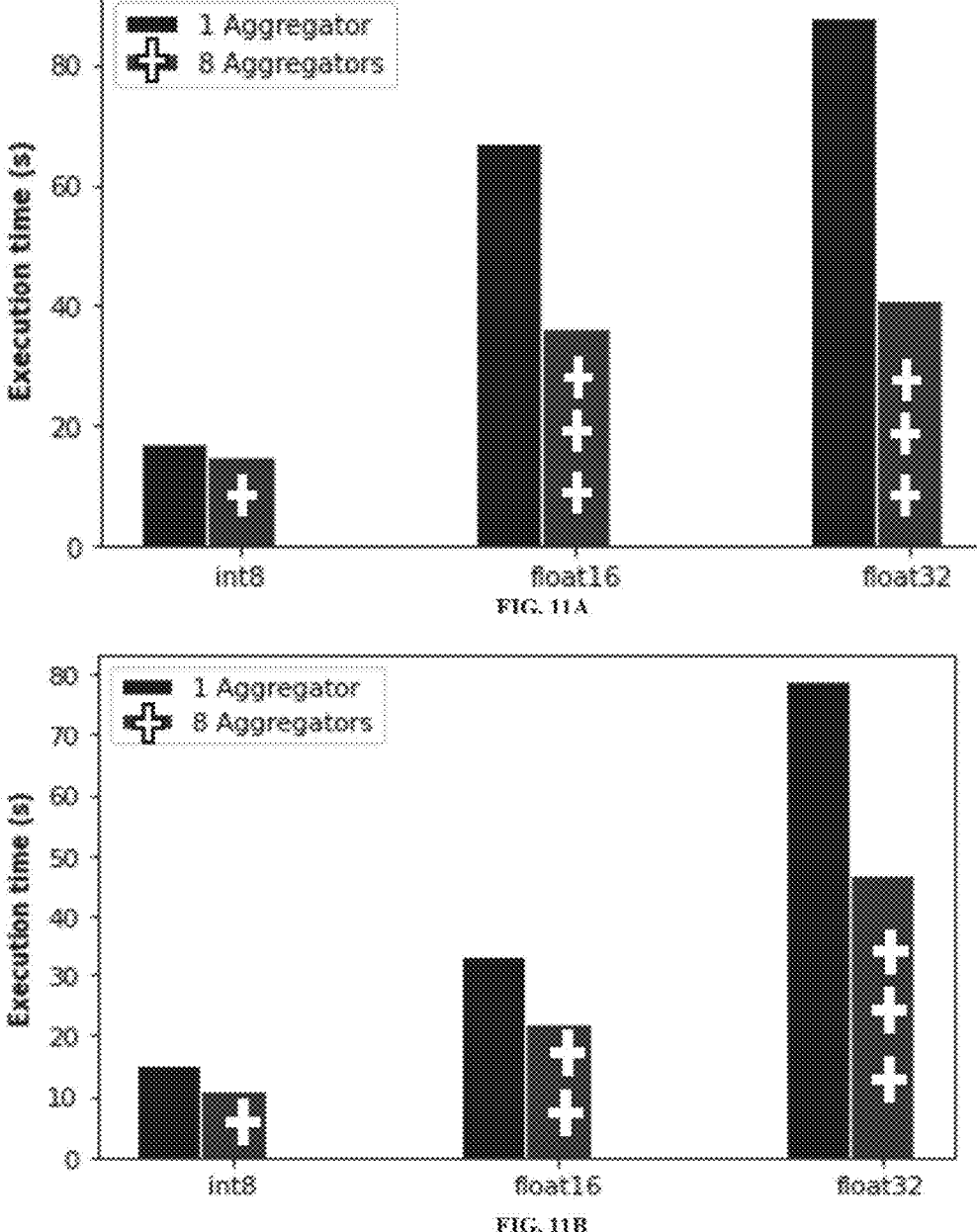

TRAINING LARGE DL MODELS VIA SERVERLESS ARCHITECTURE USING CLOUD STORAGE SERVICES-BASED COMMUNICATION CHANNEL

PRIORITY CLAIM

This U.S. patent application claims priority under 35 U.S.C. § 119 to: Indian Patent Application No. 202221034375, filed on Jun. 15, 2022. The entire contents of the aforementioned application are incorporated herein by reference.

TECHNICAL FIELD

The embodiments herein generally relate to the field of serverless architecture and, more particularly, to a method and system for training large Deep Learning (DL) models via serverless architecture using cloud storage services-based communication channel.

BACKGROUND

Serverless architecture is emerging as a platform of choice for deploying event-based applications primarily due to the ease of resource management, high scalability and cost effective deployment. Serverless architecture platforms such as Amazon Web Services (AWS) Lambda™, Azure Functions™, Google Function™, etc., have recently gained a foothold in the machine learning domain. The use of serverless platforms for deep learning inference is well known. However, training Deep Learning (DL) models using serverless platforms is still challenging due to certain inherent constraints. Serverless instances have limited compute power and a short lifetime hence may not suit large deep learning models' compute intensive and long-running training. For example, AWS serverless platform Lambda™ has a maximum of 15 minutes of instance uptime. Google Functions™ live for 9 minutes. Azure™ allows a maximum run time between 5 and 30 minutes based on the chosen plan. The number of cores made available per instance is limited as well, e.g., 6 cores, 4 cores, and 2 cores for Lambda™, Azure™, and Google Functions™ respectively. Moreover, serverless instances are stateless and lack the ability of peer-to-peer communication, restricting their use for distributed training which requires a frequent exchange of data between peers.

Despite all these challenges, serverless platforms are being explored for their applicability in various application domains including machine learning. This is primarily due to the many features offered by these platforms, such as a high scalability, ease of resource management, and a cost-effective pay-by-use cost model. Some architectures and techniques have been proposed to overcome serverless platform challenges for distributed machine learning using serverless platforms. These architectures harness compute power from serverless instance swarms and achieve persistent storage using communication channels provided as a service by cloud vendors. Additionally, there have been advancements in certain features in serverless platforms provided by cloud vendors, such as more memory and compute power per instance as well as compatibility with a larger number of cloud services. This has led to the possibility of using them as a platform for training deep learning models. Very recently, the use of serverless instances for distributed training on cloud using Virtual Machine (VM) based parameter servers and communication channels such as object storage services, caching systems, and databases has been presented. These works list advantages and limitations of serverless architecture for training models using a distributed environment and cloud services.

Efforts have been made from academia and industry to study the use of serverless platform for ML training. However, limited work is available on the performance and cost involved when serverless platforms are used with various storage services. The training of large models using serverless platform with stateful databases has also not been explored so far. One of the advantages of using databases as a communication channel is the ability to perform analytics on the data using a structured query. For example, weights and parameters of each layer in each mini-batch of the training process are stored in the database, which can be subsequently analyzed for model architecture and accuracy improvement. Additionally, model training with cloud serverless platforms and database services can be cost-effective due to per request billing resulting in a "pay-as-you-train" cost model.

One widespread implementation for ML distributed training involves the use of parameter servers using Infrastructure-as-a-Service (IaaS) on cloud as depicted in FIG. 1A. This approach involves using multiple bare-metal, virtual machines, or Function-as-a-Service (FaaS) instances as distributed workers and one of the machines called parameter server, aggregating the updates from the workers, and redistributing. The performance of FaaS vis-a-vis IaaS has been studied in detail in many works.

In a very recent work by Jian et al., a platform called LambdaML framework is proposed to study the performance and relative advantages of serverless architectures vis-a-vis serverful infrastructures for distributed training of ML models. The LambdaML framework overcomes some of the challenges of earlier works, such as slow communication between FaaS and the VM running parameter server. However, the architecture of LambdaML is limited by the maximum size of the gradients or local models and the model allowed in the cloud storage services.

SUMMARY

Embodiments of the present disclosure present technological improvements as solutions to one or more of the above-mentioned technical problems recognized by the inventors in conventional systems.

For example, in one embodiment, a method for training large Deep Learning (DL) models using a serverless architecture is provided. The method includes spawning a plurality of serverless instances defining a plurality of workers and training a DL model via the plurality of workers, by partitioning a training data among the plurality of workers. The partitioned training data is split into a plurality of mini batches is utilized sequentially during iterative execution of a plurality of training instances, until the plurality of mini batches are exhausted. The iterative execution of the plurality of training instances comprising: (a) initiating a current training instance from among the plurality of training instances by each of the plurality of workers using a current mini-batch among the plurality of mini batches and generating a plurality of trained local DL models; (b) chunking, by each of the plurality of workers, each of the plurality of trained local DL models into a plurality of segments based on a model size of each of the plurality of trained local DL models and a maximum size of one data item allowed in a cloud storage services-based communication channel; (c) writing, the plurality of segments corresponding to each of the plurality of trained local DL models to the cloud storage services-based communication channel in accordance with the maximum size of one data item allowed in the cloud storage services-based communication channel; (d) aggregating, by one or more aggregators, corresponding segments of each of the plurality of segments of each of the plurality of trained local DL models to generate a plurality of aggregated segment level DL models; (e) writing, by one or more aggregators, the plurality of aggregated segment level DL models into the cloud storage services-based communication channel; and (f) concurrently reading and concatenating, the plurality of aggregated segment level DL models by each of the plurality of workers to obtain an aggregated model generated by the current training instance, wherein the aggregated model is used by each of the plurality of workers during the successive training instances using a successive mini batch.

In another aspect, a system for training large Deep Learning (DL) models using a serverless architecture is provided. The system comprises a memory storing instructions; one or more Input/Output (I/O) interfaces; and one or more hardware processors coupled to the memory via the one or more I/O interfaces, wherein the one or more hardware processors are configured by the instructions to spawn a plurality of serverless instances defining a plurality of workers and train a DL model via the plurality of workers, by partitioning a training data among the plurality of workers. The partitioned training data is split into a plurality of mini batches is utilized sequentially during iterative execution of a plurality of training instances, until the plurality of mini batches are exhausted. The iterative execution of the plurality of training instances comprising: (a) initiating a current training instance from among the plurality of training instances by each of the plurality of workers using a current mini-batch among the plurality of mini batches and generating a plurality of trained local DL models; (b) chunking, by each of the plurality of workers, each of the plurality of trained local DL models into a plurality of segments based on a model size of each of the plurality of trained local DL models and a maximum size of one data item allowed in a cloud storage services-based communication channel; (c) writing, the plurality of segments corresponding to each of the plurality of trained local DL models to the cloud storage services-based communication channel in accordance with the maximum size of one data item allowed in the cloud storage services-based communication channel; (d) aggregating, by one or more aggregators, corresponding segments of each of the plurality of segments of each of the plurality of trained local DL models to generate a plurality of aggregated segment level DL models; (e) writing, by one or more aggregators, the plurality of aggregated segment level DL models into the cloud storage services-based communication channel; and (f) concurrently reading and concatenating, the plurality of aggregated segment level DL models by each of the plurality of workers to obtain an aggregated model generated by the current training instance, wherein the aggregated model is used by each of the plurality of workers during the successive training instances using a successive mini batch.

In yet another aspect, there are provided one or more non-transitory machine-readable information storage mediums comprising one or more instructions, which when executed by one or more hardware processors causes a method for training large Deep Learning (DL) models using a serverless architecture.

The method includes spawning a plurality of serverless instances defining a plurality of workers and training a DL model via the plurality of workers, by partitioning a training data among the plurality of workers. The partitioned training data is split into a plurality of mini batches is utilized sequentially during iterative execution of a plurality of training instances, until the plurality of mini batches are exhausted. The iterative execution of the plurality of training instances comprising: (a) initiating a current training instance from among the plurality of training instances by each of the plurality of workers using a current mini-batch among the plurality of mini batches and generating a plurality of trained local DL models; (b) chunking, by each of the plurality of workers, each of the plurality of trained local DL models into a plurality of segments based on a model size of each of the plurality of trained local DL models and a maximum size of one data item allowed in a cloud storage services-based communication channel; (c) writing, the plurality of segments corresponding to each of the plurality of trained local DL models to the cloud storage services-based communication channel in accordance with the maximum size of one data item allowed in the cloud storage services-based communication channel; (d) aggregating, by one or more aggregators, corresponding segments of each of the plurality of segments of each of the plurality of trained local DL models to generate a plurality of aggregated segment level DL models; (e) writing, by one or more aggregators, the plurality of aggregated segment level DL models into the cloud storage services-based communication channel; and (f) concurrently reading and concatenating, the plurality of aggregated segment level DL models by each of the plurality of workers to obtain an aggregated model generated by the current training instance, wherein the aggregated model is used by each of the plurality of workers during the successive training instances using a successive mini batch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A through 3B (collectively referred as FIG. 3) is a flow diagram illustrating a method for training large DL models via serverless architecture using a cloud storage services-based communication channel, using the system of FIG. 2A, in accordance with some embodiments of the present disclosure.

FIGS. 11A and 11B illustrate effect of gradient data type on execution time computed using the analytical model, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Like any other distributed training environment, serverless platform-based training is also based on four essential elements: (1) Distributed optimization algorithm, (2) Communication channel or shared storage, (3) Communication pattern, and (4) Synchronization protocol. The distributed model training in the serverless platform is accomplished as follows:

Step 1: Spawn multiple serverless instances (known as workers) and distribute training data amongst them by downloading it from the storage device.

Step 2: Train the model at each instance using the corresponding training data.

Step 3: On completion of each mini-batch of training data, send gradients or local models from all the workers to the communication channel.

Step 4: Aggregate the data collected from all the workers and send back the aggregated gradients or model to all the workers, then continue with the next mini-batch of the training data.

Figure 1A:
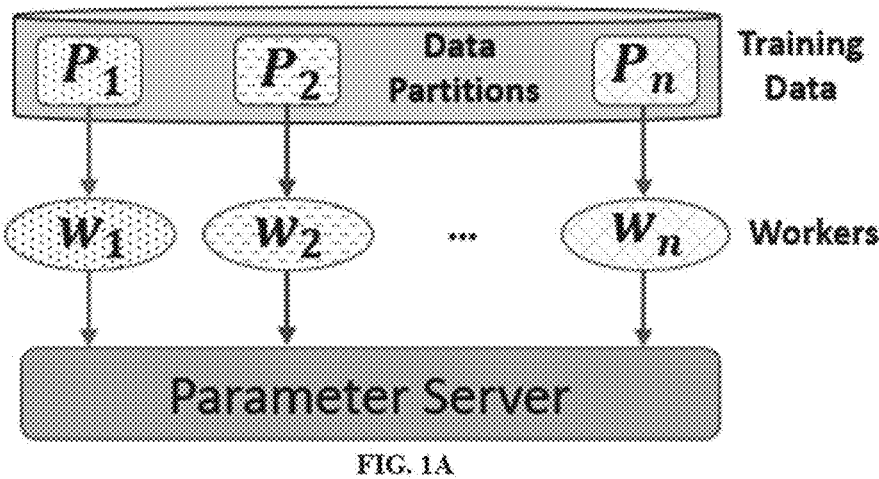
FIGS. 1A and 1B are block diagrams of prior art frameworks for distributing computing using parameter server and abstract representation of LambdaML framework for distributed training of Deep Learning (DL) model in a serverless architecture, respectively.
Figure 1B:
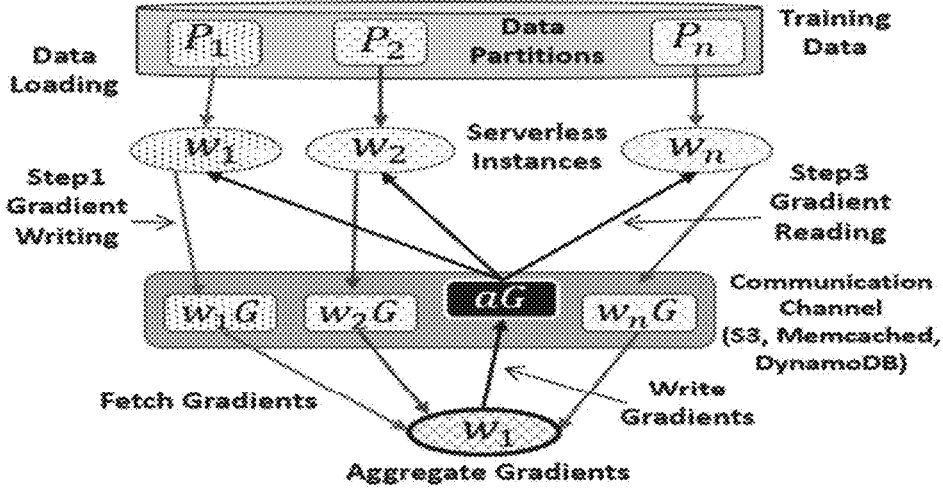

The existing LambdaML framework implementing the steps 1-4 for distributed training of DL models is depicted in FIG. 1B. However, the LambdaML of FIG. 1B trains ML/DL models using storage services S3, small and tiny models using Memcached, and DynamoDB, respectively. The LambdaML uses S3 to store partitioned training data. The framework implements two optimization algorithms: distributed stochastic gradient descent (DSGD) and distributed alternating direction method of multipliers (ADMM). The DSGD is implemented using gradient average (GA) and model averaging (MA) methods. Also, LambdaML implements two MPI based communication patterns called All-Reduce and ScatterReduce. In an AllReduce implementation, each worker instance writes gradients to the storage. The master instance reads the updates from all the workers and aggregates them. The aggregated updates are written back in the storage device. Each of the workers now read the aggregated gradients and update their model. In a ScatterReduce implementation, each worker divides the update into partitions equal to the number of workers. Each worker saves the partitions separately to the storage device. The master aggregator now pulls the respective partitions from all the workers and aggregates them before saving them back to the storage device. Next, the aggregated updates are consumed by each of the workers. One of the critical features in the framework is the capability of handling long-running training jobs. AWS Lambda functions have a lifetime of 15 minutes. All the workers in the framework keep track of the execution and save the model's state as the timeout approaches. A new set of Lambda instances are spawned to restart the training process using the same partitioned data, corresponding checkpoint, and the saved model state.

Currently, LambdaML is the first and only framework to implement serverless platform based distributed training using key-value store database as a communication channel. However, one of major technical limitations of the LambdaML framework is its inability to train large deep learning (DL) models using database services on cloud as a communication channel. The reason being that the framework assumes the size of local models trained or gradients generated during each training instances by each worker to be smaller than the size of one data item or row allowed in the database used as a communication channel. This is depicted in table I.

TABLE I

THE SIZE OF MODELS IMPLEMENTED IN LAMBAML USING VARIOUS COMMUNICATION CHANNELS WITH SERVERLESS PLATFORM LAMBDA

| Storage | Storage type | Model Size |
|---------|-------------|------------|
| S3 | Object store | Any (large and small) |
| Memcached | Key-value in-memory | Less than 130 MB (small) |
| DynamoDB | Key-value NoSQL database | Less than 400 KB (very small) |

This assumption is a technical limitation of the LamdaML framework for training DL models where the model or their gradient size (local models) is more than the maximum allowed data item size in the data storage system. Thus, training of large DL models using distributed training on serverless platform is unaddressed domain.

Embodiments of the present disclosure provide a technical solution to the above technical problem by disclosing a method and system for training large Deep Learning (DL) models via serverless architecture using a cloud storage services-based communication channel when the gradients of the DL model to be trained are larger than maximum allowed size of one or single data item in the cloud storage services-based communication channel, interchangeably referred hereinafter as communication channel or data storage. Thus, the term 'large' herein is to be interpreted in context of size of gradients in comparison to maximum allowed size of one (single) data item allowed by the communication channel. The gradients, also referred to as local DL models, generated by each worker, similar to the LamdaML framework during a current training instance are thus chunked into a plurality of segments and are stored in the communication channel, such as a DynamoDB, S3, Memcached or the like. Corresponding segments of each worker are aggregated by one or more aggregators and stored back to the data storage. The manner in which the segments are stored can be modified in accordance with the maximum size of one data item allowed of the communication channel. Thereafter, each of the aggregated corresponding segments are read by each worker to generate an aggregated model to be used during successive training instance. The method disclosed herein, provides optimization techniques such as multi-threading, multiple aggregators, data types etc. with the cloud storage services-based communication channels resulting in a significant improvement in the performance and the cost of training.

Referring now to the drawings, and more particularly to FIGS. 2A through 11B, where similar reference characters denote corresponding features consistently throughout the figures, there are shown preferred embodiments and these embodiments are described in the context of the following exemplary system and/or method.

Figure 2A:
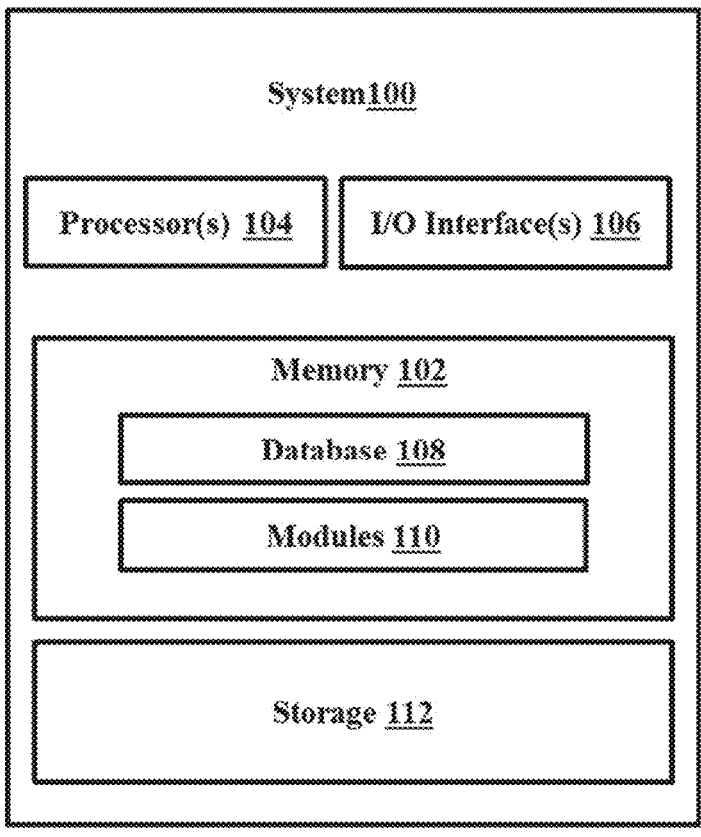
FIGS. 2A and 2B is a functional block diagram and an architectural block diagram respectively of a system for training large Deep Learning (DL) models via the serverless architecture using a cloud storage services-based communication channel, in accordance with some embodiments of the present disclosure.
Figure 2B:
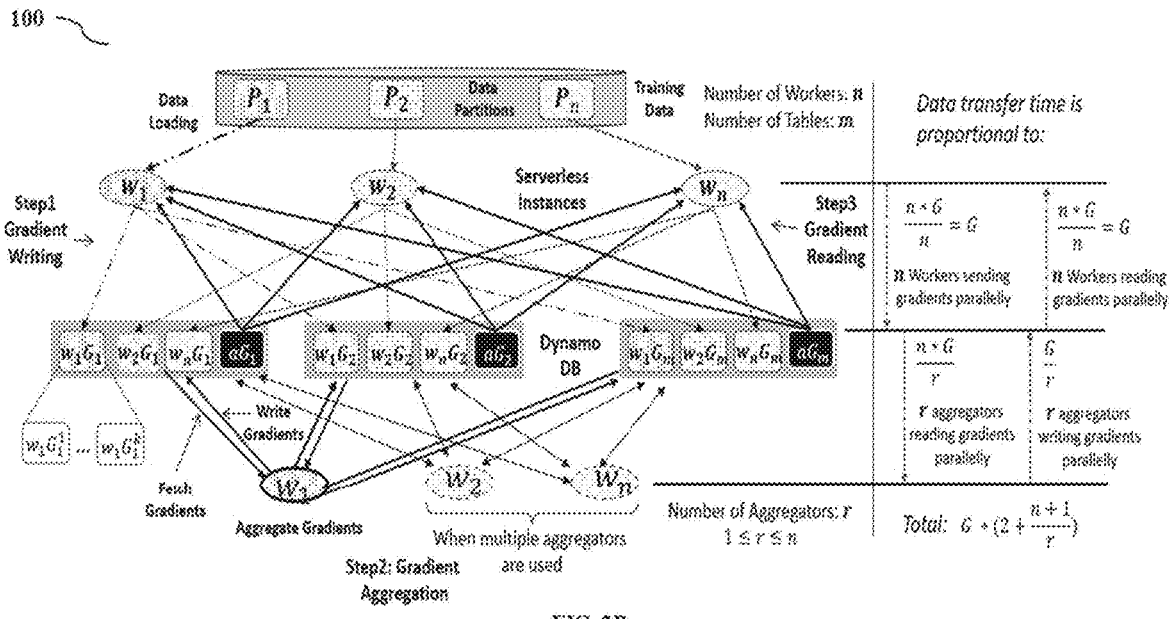

FIGS. 2A and 2B is a functional block diagram and an architectural block diagram respectively of a system 100 for training large Deep Learning (DL) models via the serverless architecture using a cloud storage services-based communication channel, in accordance with some embodiments of the present disclosure. The system 100 is a distributed environment system. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including virtual machines, fog devices, edge devises comprising laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. The plurality of modules 110 include programs or coded instructions that supplement applications or functions performed by the system 100 for executing different steps involved in the process of training large Deep Learning (DL) models via the serverless architecture using the cloud storage services-based communication channel. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules in the module(s) 110. Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). The system 100 further includes a storage 112 comprising at least one of an object storage such as S3, database storage DynamoDB, a cache storage such as Memcached, or the like that function as the cloud storage-based communication channel. Functions of the components of the system 100 are now explained with reference to steps in flow diagrams in FIG. 3A through FIG. 11B.

9

Figure 3B:
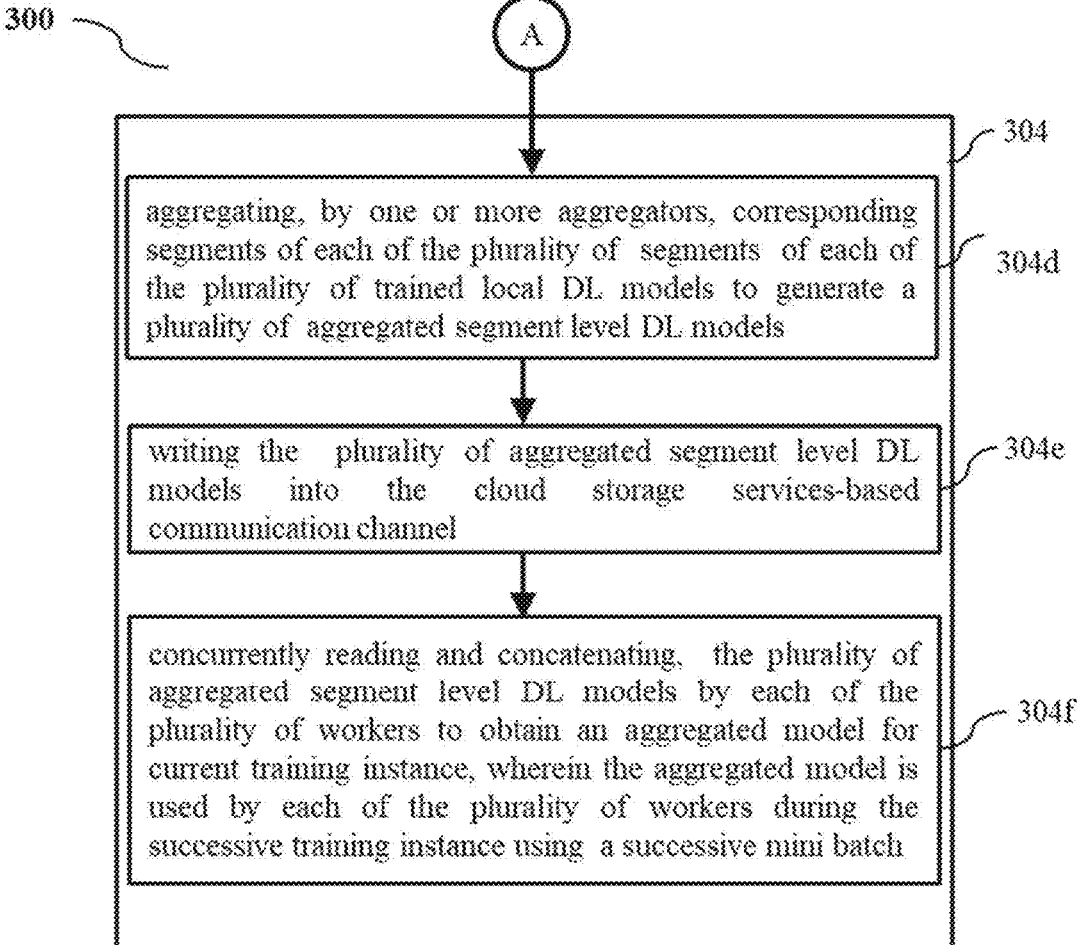

FIGS. 3A through 3B (collectively referred as FIG. 3) is a flow diagram illustrating a method 300 for training large DL models via serverless architecture using the cloud storage services-based communication channel, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIGS. 2A and 2B and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Some of the advantages of the database as a communication channel includes its high availability, performance, data security, optimal cost on a serverless database, and integration with cloud services such as serverless platforms. Additionally, database services have tools for performing analytics, extracting insights and monitoring workload. It can be noted that steps of the method 300 are explained with a key-value store database as an example of cloud storage services-based communication channel and it can be equally implemented on any other communication channel in accordance with the maximum size of one data item of respective communication channel.

The maximum item size that can be stored in the key-value database table's row is relatively smaller than object storage and object caching systems (e.g., 400 KB in AWS DynamoDB and 2 MB in Azure Cosmos database). The gradient or model updated from a worker can be saved in one cell or row if the size is smaller than the maximum allowed size. However, saving model updates or gradients larger than the maximum limit requires multiple cells. Hence the approach used for communication channels such as parameter server, caching systems (130 MB in AWS Memcached) and object storage (5 TB in AWS S3) is not applicable, especially for key-value data stores.

Referring to the steps of the method 300, at step 302 of the method 300, the one or more hardware processors 104 spawn a plurality of serverless instances defining a plurality of workers. At step 304 of the method 300, the one or more hardware processors 104 train a DL model by the plurality of workers by partitioning the training data among the plurality of workers. The partitioned training data is split into a plurality of mini batches and is utilized sequentially during iterative execution of a plurality of training instances, until the plurality of mini batches are exhausted.

The iterative execution of the plurality of training instances comprises of following steps:

a) Step 304*a*—Initiate a current training instance among the plurality of training instances by each of the plurality of workers using a current mini-batch among the plurality of mini batches. Thus, at the end of each mini batch a plurality of trained local DL models, also referred as gradient are generated.

b) Step 304*b*—It can be understood that while building large DL models trained over huge volume of data, even each local DL model or the gradient generated may be of size higher that the maximum size of one data item of the communication channel used for aggregating the layered training of the DL model. Thus, the each of the plurality of workers are configured to chunk, each of the plurality of trained local DL models into a plurality of segments based on a model size of each of the plurality of trained local DL model and maximum size of one data item of the cloud storage services-based communication channel. For example, Dynamo-DB allows maximum size of 400 KB chunks, S3 allows whole array, while Memcached allows 130 MB chunks. The gradient is divided into multiple segments such that the size of each segment is smaller than the maximum data item size allowed (refer to FIG. 4). For example, suppose size of the local DL model, also interchangeably referred as gradient or gradient vector, generated by the worker is G and the max data item size for one row in the database allowed is I in accordance with the data storage specification of the communication channel, then the number of gradient vector segments generated is:

$$N_{seg} = \left\lceil \frac{G}{I} \right\rceil \tag{1}$$

Figure 4:
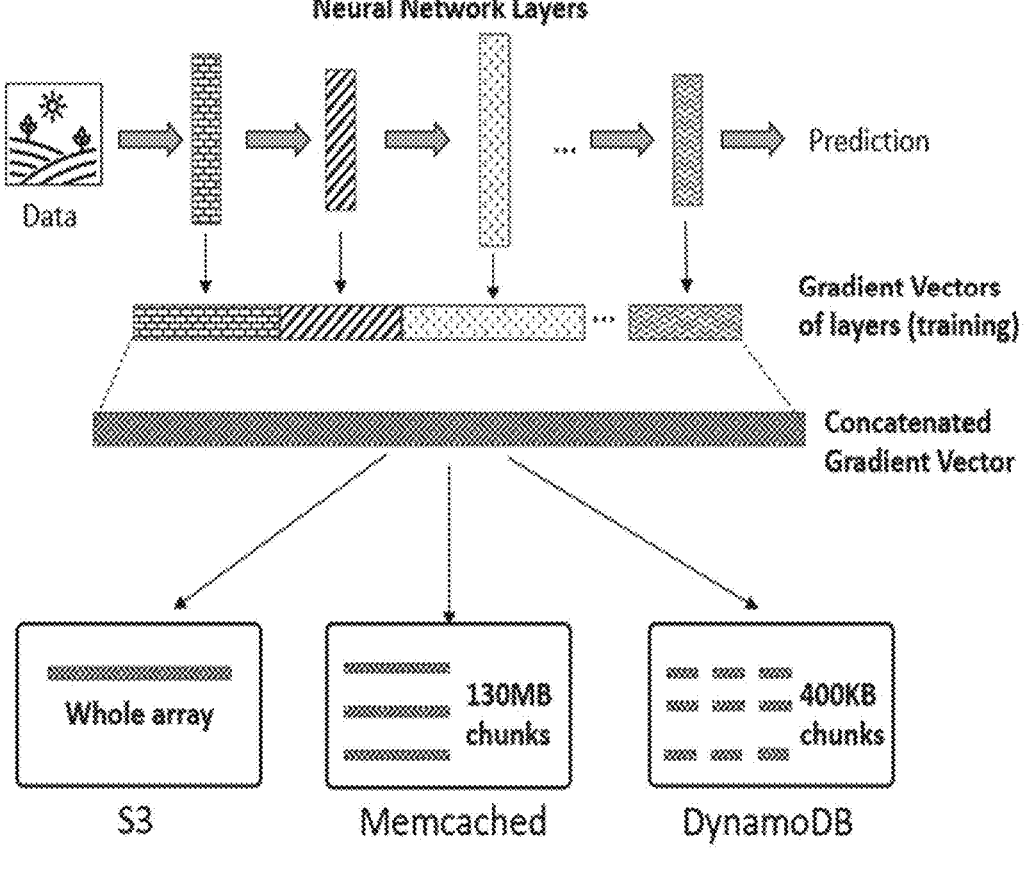
FIG. 4 illustrates a schematic view of characteristics of the cloud storage services-based communication channels depicting maximum allowed size of a single data item by S3, Memcached, DynamoDB, in accordance with some embodiments of the present disclosure.

The method disclosed not only enables chunking of the local DL model or the gradients but also provides a technique to optimize the size of segment during chunking. As depicted in FIG. 4, chunking is based the communication channel (cloud service) used, total size of the gradient vector, configuration of the lambda functions. The schema for storing gradient is dependent on the communication channel. For example, when using DynamoDB as a communication channel, the optimal chunk size is derived by fine tuning the number of tables to use for storing tables, number of db workers, number of Lambda instances etc. An algorithm1 defining the size of segment for DynamoDB this is given below:

Algorithm 1:

Let: MAX_GRDA_SIZE be gradient size, L be the number of cores available on serverless instance, D be the max data item size allowed in communication channel Mind be a small chunk size decided heuristically, num_tables as tables or buckets in communication channel, num_workers be the number of threads running concurrently in communication channel, chunk_size is the size of gradient chunks Initialize: Data_rate=1

Algorithm 1:

```
for Gradient_size in [MAX_GRAD_SIZE]:
    single_grad_tensor = torch.tensor(np.ones(int(Gradient_size/4), dtype
    = p.float32))
    for tmp_num_table in [1 to L]:
        for tmp_num_workers in [1 to L]:
            for tmp_chunk_size in [Mind to D]:
                find grad_writing_time; // time to write gradient in comm
channel
tmp_data_rate = data_size_in_bytes / grad_writing_time
            if (tmp_data_rate > data_rate)
            data_rate = tmp_data_rate
        chunk_size = tmp_chunk_size
        num_table = tmp_num_table
        num_workers = tmp_num_workers
        endif
```

-continued

```
            endfor
        endfor
    endfor
        chunk_size, num_tables, num_worker are optimal chunk size,
number of data tables and worker threads in the communication channel
``` c) Step 304c—The plurality of segments ($N_{seg}$) corresponding to each of the plurality of trained local DL models are written to the cloud storage services-based communication channel in accordance with the maximum size of one (single) data item of the communication channel. The FIG. 2B depicts gradient G of worker w1, w2 . . . , wn spilt as G1, G2, G3 . . . Gm.

d) Step 304d—Once the generated local DL model of each worker is stored, the learning in current training instance needs to be captured for the next training instance. Thus, one or more aggregators aggregate corresponding segments of each of the plurality of segments of each of the plurality of trained local DL models to generate a plurality of aggregated segment level DL models. Since one or more among the plurality of workers function as an aggregator, the maximum number of aggregators (r) can be equal to the number of spawned serverless instances (n) i.e., 1≥r≥n Number of aggregators to be identified for a specific implementation of the system 100 is based on performance gain achieved by the system 100 with increase in number of workers. This can be predetermined experimentally for a given system implementation. For example, aggregated segment level DL model for G1 is 'aG1', which is aggregation of w1G1, w2G1, . . . , wmG1 as depicted in FIG. 2B.

e) Step 304e—Thereafter, the plurality of aggregated segment level DL models (aG1 through aGm are written into the cloud storage services-based communication channel.

f) Step 304f—Thereafter, the plurality of aggregated segment level DL models are concurrently read and concatenating, by each of the plurality of workers to obtain an aggregated model generated by the current training instance. This aggregated model is used by each of the plurality of workers during the successive training instance using a successive mini batch.

Technical challenge in utilizing the cloud storage services-based communication channel for distributed training is the communication overhead. In addition, when the generated large gradients are further split into segments, this adds on to the communication overhead for reading and writing the data of the generated gradients and aggregating them. To address the technical challenge the method disclosed herein accelerates the communication using one or more optimization techniques mentioned below:

a) Utilizing a plurality of tables for storing the plurality of segments of each of the plurality of local models, when the cloud storage based communication channel is a database storage.

b) Utilizing the plurality of aggregators that read and write to the cloud storage services-based communication channel concurrently, reducing communication overhead.

c) Writing the plurality of segments corresponding to each of the plurality of trained local DL models to the cloud services based communication channel by creating batches of the plurality of segments and using multiple threads within each worker transfers the batches in parallel to the cloud storage services-based communication channel, and wherein multiple threads can leverage multiple cores available on each of the plurality of serverless instances.

d) Reducing a number of the plurality of segments created for each of the plurality of trained local DL models by converting data elements of each of the plurality of trained local models to float16 and int8 based on the DL model and value of range of the trained local DL model.

Referring back to the architecture of the system 100 in FIG. 2B, the FIG. 2B is a schematic representation of algorithm 2 below explaining training of the large DL model disclosed by the method 300 using the key value data store with only one aggregator.

Algorithm 2: Segmented Gradient Aggregation Algorithm for One Aggregator

Input Model M

Set of database tables: T

Number of database tables|T|

Set of workers: W

Number of workers: |W|

Max size per insert in DynamoDB: I

Max number of inserts per batch: $b_N$

Max batch insert size: B

Output: Aggregated and averaged gradients $G_a$

1. Iterated over layers of model M and collect gradients in the form of a single vector, call it G 2. Break G into |T| smaller vector segments of equal size, one for each database table. Denote gradient vector for table t (t∈ T) by $G_t$ 3. Further break every $G_t$ gradient vector segment into k equally sized smaller vector segments $G_t^1, \ldots, G_t^k$, where, $$k = \left\lceil \frac{|G_t|}{I} \right\rceil.$$

4. Execute concurrent batch insert queries over database tables, where batches for table t are given by $$G_t^i, \ldots, G_t^{i+B}, i \in \left(1, 2, \ldots, \left\lceil \frac{k}{b_N} \right\rceil\right)$$

5. if Current worker is Aggregator then

6. Perform concurrent scan queries over every table t∈ T.

7. Every table t returns back $G_t$ in form of k vector segments $G_t^1, \ldots, G_t^k$, from every worker w∈ W. Denote $G_t$ from worker w as $w(G_t)$ 8. Perform aggregation and average:

$$a(G_t) = \frac{1}{|W|} \Sigma_{w_j \in W} w_j(G_t)$$

9. Store $a(G_t)$ in table t. The aggregated gradient vectors are stored in form of k segments $a(G_t^1), \ldots, a(G_t^k)$ bunched into $$\left\lceil \frac{k}{b_N} \right\rceil$$

batches 10. end

11. Concurrently read back aggregated and averaged gradients vectors a($G_t$) from every table t. Every table t returns back a($G_t$) in form of k segments a($G_t^1$), . . . , a($G_t^k$))

12. Create a single aggregated gradient vector a(G) by: first concatenating vector segments a($G_t^1$), . . . , a($G_t^k$)) received from table t to form a($G_t$) and further concatenating a($G_t$) from different tables to form a(G)

13. Iterate over layers of model M in sequence and put back aggregated gradients from a(G)

The algorithm 2 consists of three steps: gradient (local DL model) save (lines 1 to 4 of algorithm), gradient aggregation (lines 5 to 10 of algorithm), and gradient update (lines 11 to 13 of algorithm). As depicted in FIG. 2B, each worker trains the model on its allocated data partitions (mini batches) and transfers the gradient vector in multiple segments to tables in the database (shown as step 1). Once the gradients are received from all the workers, the master worker pulls the gradient segments from all the tables, aggregates them, and saves them back in the tables (shown as step 2). Further, each worker pulls the aggregated gradients (shown as step 3) and continues with the next mini-batch. One implication of this approach is an increase in the number of communications from a worker and aggregator by a factor of 2$N_{seg}$, where $N_{seg}$ denotes the number of gradient vector segments as shown in equation 1. In order to accelerate the communication between workers and the database, optimization solutions for the key value data store are as discussed below.

Multiple tables for storing gradient vector segments: Multiple tables in the database so that these workers can simultaneously access these tables and save updates in parallel. The number of tables used in the database equals the number of workers. Each worker first divides the gradient vector into segments (one per table) and writes these gradient vector segments in the tables concurrently. While reading updates, the lead aggregator worker reads the corresponding gradient segments from each table. The aggregation and averaging of gradient vectors are performed over the gradient vector segments. The aggregated and averaged gradient vector segments are written back in batches to all the tables concurrently. Thus, each table contains a part of the overall aggregated and averaged gradient vector. All workers can read the aggregated gradient vector segments from the tables concurrently and concatenate the segments to form a single aggregated gradient vector.

a) Multiple Aggregators: Multiple aggregators are used that read and save back aggregated gradient segments in the table concurrently unlike only one aggregator used in existing LamdaML framework. This reduces the communication overhead due to the parallel read and write of the gradient segments by the aggregators, b) Multiple threads for saving gradients: Batches of gradient vector segments are created and multiple threads within each worker are used to transfer these batches in parallel to the database. The multiple worker threads can leverage multiple cores available on each serverless instance.

c) Sending gradients in batches: In order to reduce the read and writes to the database from each worker, multiple read and write requests are combined. Each worker sends write requests to save the batches of gradient vector segments and later reads them from tables. This results in a significant reduction in the communication overhead and cost.

d) Data type: As discussed earlier, the biggest bottleneck in the approach in data storage based communication channel is the communication overhead. The amount of data transferred (gradient vector) affects the communication overhead. The default datatype in PyTorch is float32.

However, the data elements of the gradients are converted to float16 and int8 based on models and their gradient value range. The conversion of data type to float16 or int8 reduces the number of segments created for gradient vector. This proportionally affects the number of requests sent to the database from the workers resulting in a significant reduction in the communication overhead. In the experimental evaluation mentioned later reduction of 3.1×, 2×, 5.2× in execution time with different data storages such as Memcached, S3, and DynamoDB respectively is observed. One of the biggest concerns in this approach is the loss of information and the model's accuracy. However, this approach is applicable in all the scenarios where the range of gradient values can fit in float16 and int8 data types without curtailing the information bits.

TABLE II

| AVERAGE VALUE OF CONSTANTS USED IN THE ANALYTICAL MODEL | | |
|---|---|---|
| Symbol | Meaning | Average value |
| T(w) | Function Cold start | appx. 2 s |
| $B_{s3}$ | S3 bandwidth | 65 MB/s |
| $B_M$ | Memcached bandwidth | 650 MB/s |
| $B_D$ | DynamoDB bandwidth | 70 MB/s |

ANALYTICAL MODEL: In order to estimate the performance and cost of training in deep learning models using a serverless platform with multiple communication channels, the method disclosed provides an analytical model. Using the analytical model, the time and hence the cost to complete n mini-batches or epochs is estimated. Let the algorithm 1 require E epochs to reach convergence using one worker, where each epoch involves training over $N_B$ mini-batches, Assuming that S($\omega$) denotes the scaling factor, such that spawning w workers will result in more epochs to reach convergence. The total execution time of the FaaS for w workers can be calculated as follows:

$$F_t(N_B; n) = T_{CS} + T_{dl} + T_{comp} + T_{CO} \times (T_{SO} \times T_C) + T_{Acomp} \quad (2)$$

where, individual terms are described in table II and III.

$$T_{dl} = \frac{S}{B_{S3}} \quad (3)$$

$$T_{CO} = S(n) \quad (4)$$

$$T_{SO} = Sync(n) \quad (5)$$

$$T_C = E \times \frac{N_B}{n} \times G \times \left( \frac{2 + \frac{n+1}{r}}{B_{S_3|M|D}} + L_{S_3|M|D} \right) \quad (6)$$

$$T_{Acomp} = E \times \frac{N_B}{n} \times Compute\ (n, G) \quad (7)$$

TABLE III

| SYMBOLS USED IN THE ANALYTICAL MODEL | |
|---|---|
| $T_{CS}$ | Cold start time |
| $T_{dl}$ | Data loading time |
| $T_C$ | Communication time |
| $T_{SO}$ | Synchronization overhead |
| $T_{Acomp}$ | Gradient aggregation compute time |

TABLE III-continued

| SYMBOLS USED IN THE ANALYTICAL MODEL | |
| --- | --- |
| $T_{Mcomp}$ | Model compute time |
| S | Training Data Size |
| $T_{CO}$: S(n) | Communication Overhead factor (due to w workers) |
| E | Number of Epochs (non-distributed training) |
| $N_B$ | Total number of mini-batches |
| n | Number of workers |
| r | Number of aggregators |
| Sync(n) | Synchronization overhead |
| G | Memory size of Gradients |
| $L_{S3|M|D}$ channels | Latency of per unit data insert (read) to (from) communication |

Here $$\frac{N_B}{n}$$

represents the number of gradient aggregation rounds required for one epoch. Each aggregation round results in $$2 + \frac{n+1}{r}$$

communications with communication channel (FIG. 2B) due to a) the gradient upload by n workers on the communication channels; b) gradient downloads for the aggregation by r aggregators; c) uploading the aggregated gradients by r aggregators on the communication channel and d) downloading the aggregated gradients by n workers. Equation 6 holds true when the whole gradient vector fits in a single data item in the key-value store database. However, larger deep learning models require multiple data items to be employed. In such cases, utilization of the available bandwidth ($B_D$) depends on the message size, batch size, concurrency, and the number of tables employed for the gradient storage. Hence Tc becomes:

$$T_C = \frac{N_B}{n} \times G \times \left( \frac{2 + \frac{n+1}{r}}{F_S \times N_{db} \times BT_S} + L_{S_3|M|D} \right) \quad (8)$$

Where, $F_s$ is the size of each segment of gradients, $N_{db}$ is the number of concurrent read and write threads, and $BT_s$ is the maximum allowed batch size.

Effect of communication overhead in large models: With an increase in the size of the model and hence it is gradient vector G, the term $N_{seg}$, which denotes number of gradient vector segments to be stored (Equation 1) increases proportionally. This results in an additional communication overhead, particularly in DynamoDB where the maximum data item size allowed is much smaller than S3 or Memcached.

Predicting the total cost of training a model requires knowledge of the number of epochs completed for convergence. Estimating the number of epochs has been the focus of many prior works. As discussed earlier, the objective of the method disclosed is to show the feasibility of distributed serverless computing using a key-value database as a communication channel and compare its performance with object storage (S3) and Memcached. Nonetheless, the proposed model can be used with other works to estimate the performance and cost for convergence.

TABLE IV

| THREE USECASES EVALUATED IN STUDY | | | |
| --- | --- | --- | --- |
| Use case | Model Size (MB) | Model Type | Data set |
| MobileNet | 12 | Image classification | Cifar10 |
| NISER | 17 | Recommender system | Diginetica |
| BCD4REC | 24 | Recommender system | Diginetica |

EXPERIMENTAL SETUP: Implementation of the system 100 is evaluated using three different types of deep neural networks as discussed below in table IV. Batch-Constrained Distributional Reinforcement learning for Session-based Recommendations (BCD4REC) is in house tool. It trains an offline RL agent to learn a policy that can recommend a set of products based on the available products previously not clicked by the user. A public dataset, Diginetica, is used for BC4REC training consists of 321K training sessions and 65K products. NISER: Another in-house tool. Normalized Item and Session Representations (NISER) is a session based recommender system that employs a Graph Neural Network algorithm. NISER deep learning model is trained on the Diginetica dataset consisting of around 720K training sessions and 43K unique product items. MobileNet (MN) is a popular deep neural network based on depth-wise separable communication. MN is trained on the Cifar10 dataset. The size of the gradients is 12 MB and the size of each input image is 32×32. The objective of the experiments on the system 100 is not to study the model convergence and accuracy using serverless platforms, it has been studied extensively. The experiments are performed to study system efficiency by measuring the execution time for a fixed number of mini-batches or epochs, which is sufficient to compare the performance and cost of communication channels (80 mini-batches in our workloads), including key-value store. The training data for each experiment are randomly shuffled and split into a training set (80%) and a validation set (20%) The learning rate varies between 0.001 to 0.01 based on the optimal value for each model. The Lambda memory is configured with 10 GB resulting in the allocation of maximal 6 cores for each of the instances. A DSGD optimization algorithm is used with gradient aggregation in all experiments.

EXPERIMENTS: In this section the evaluation of our distributed training approach for larger deep learning models using the system and method disclosed herein is discussed. Experiments are focused on comparing the performance (execution time) and the cost of data storage (DynamoDB, Memcached, S3) of cloud services for models of varying sizes. Primarily the gradient segmentation approach is evaluated on DynamoDB and optimization techniques on DynamoDB, Memcached and S3.

Execution time: In this experiment, the time taken to complete one epoch is compared by varying no. of workers on Lambda instances when S3, Memcached, and DynamoDB are used as communication channels for workloads such as BCD4REC NISER. From FIGS. 5A, 5B and 5C it can be concluded that (a) DynamoDB is the slowest among three communication channels and (b) the time to complete one epoch reduces with an increase in the number of workers up to 16. This is because the training data gets distributed equally amongst the workers. However, beyond 16 workers in each of the workloads, no significant gain in the execution time is observed because the communication overhead exceeds the gain due to workload division.

Figure 6A:
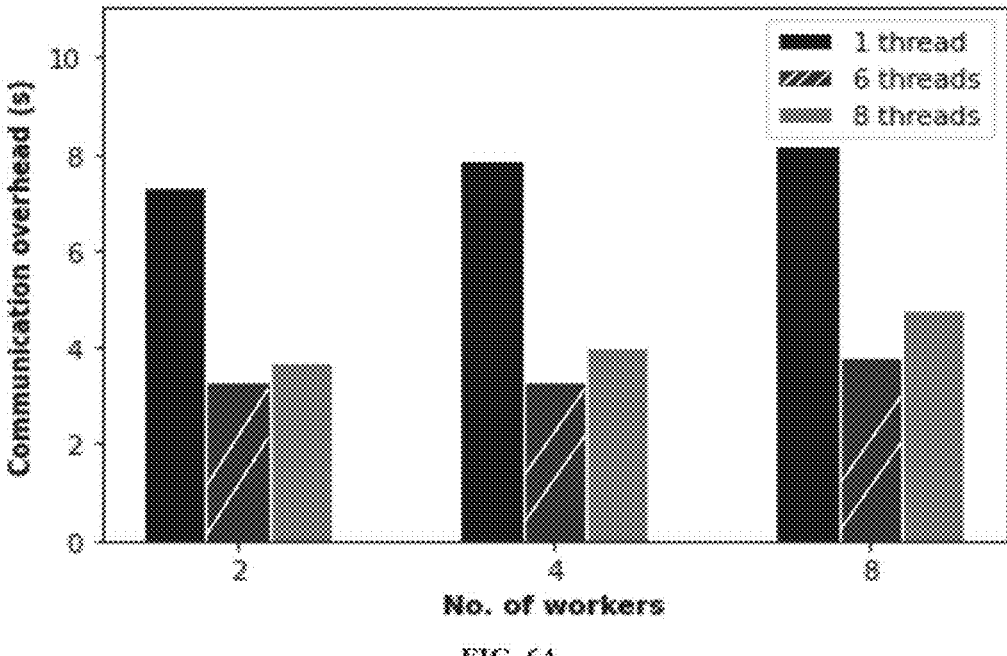
FIGS. 6A through 6C illustrate comparative results of effect of multi-threading on communication overhead during of training for multiple DL models with increasing number of workers spawned in the serverless architecture across multiple communication channels, in accordance with some embodiments of the present disclosure.
Figures 6B, 6C:
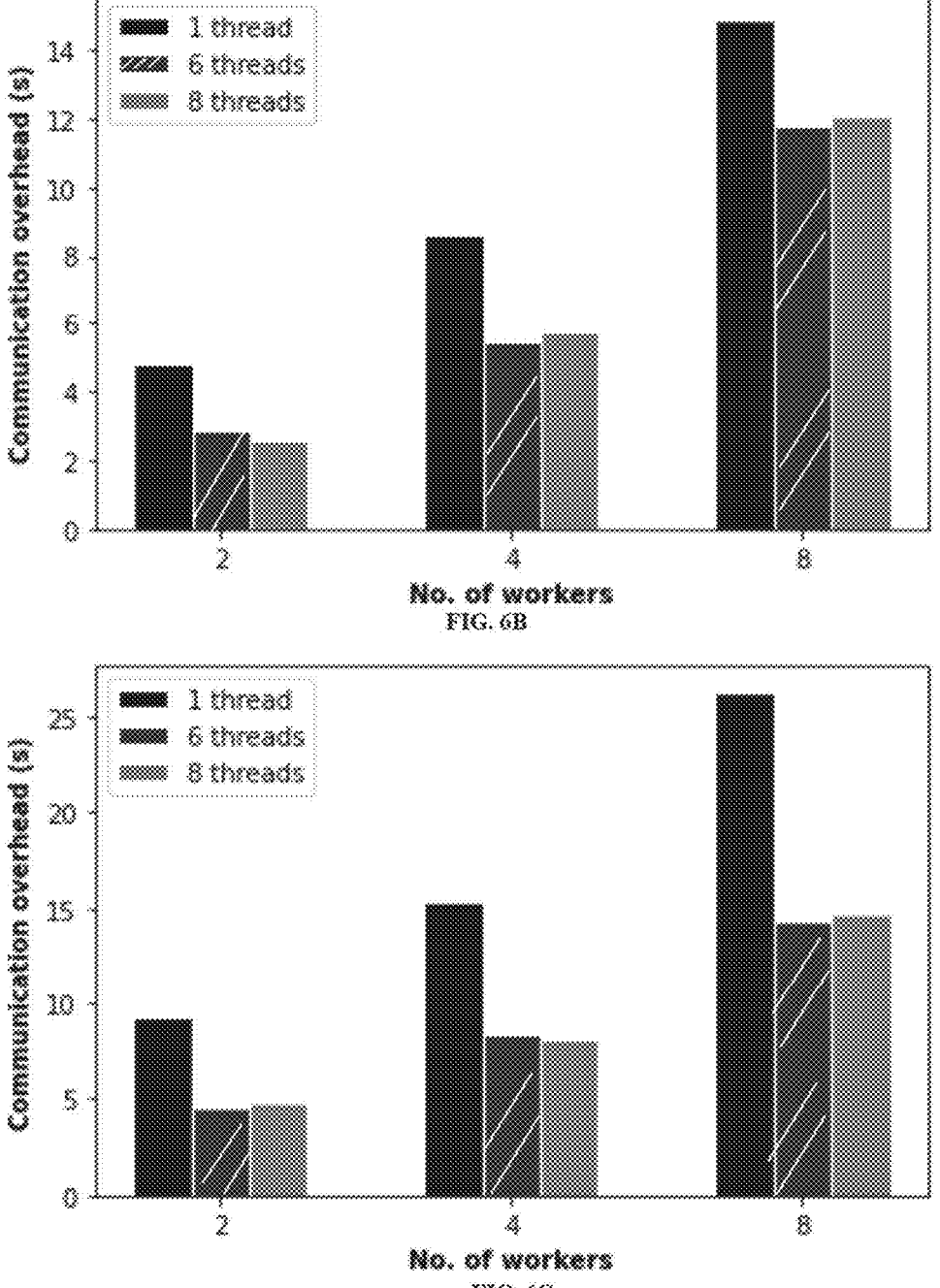

Optimization with parallel threads: A few optimizations are applied to reduce the communication overhead and cost of implementation. As discussed in earlier, multiple threads are used in each Lambda instance to store the segmented gradients in the DB tables. The effect of the number of threads with the increasing number of Lambda instances on the communication time is as shown in FIGS. 6A, 6B and 6C. The communication overhead reduces significantly when multiple threads store segmented gradients in DynamoDB tables. The optimal number is achieved with 6 threads running of (a) NISER (b) BCD4REC in parallel on each instance with 6 cores (maximum available cores on Lambda).

Figures 5A, 5B:
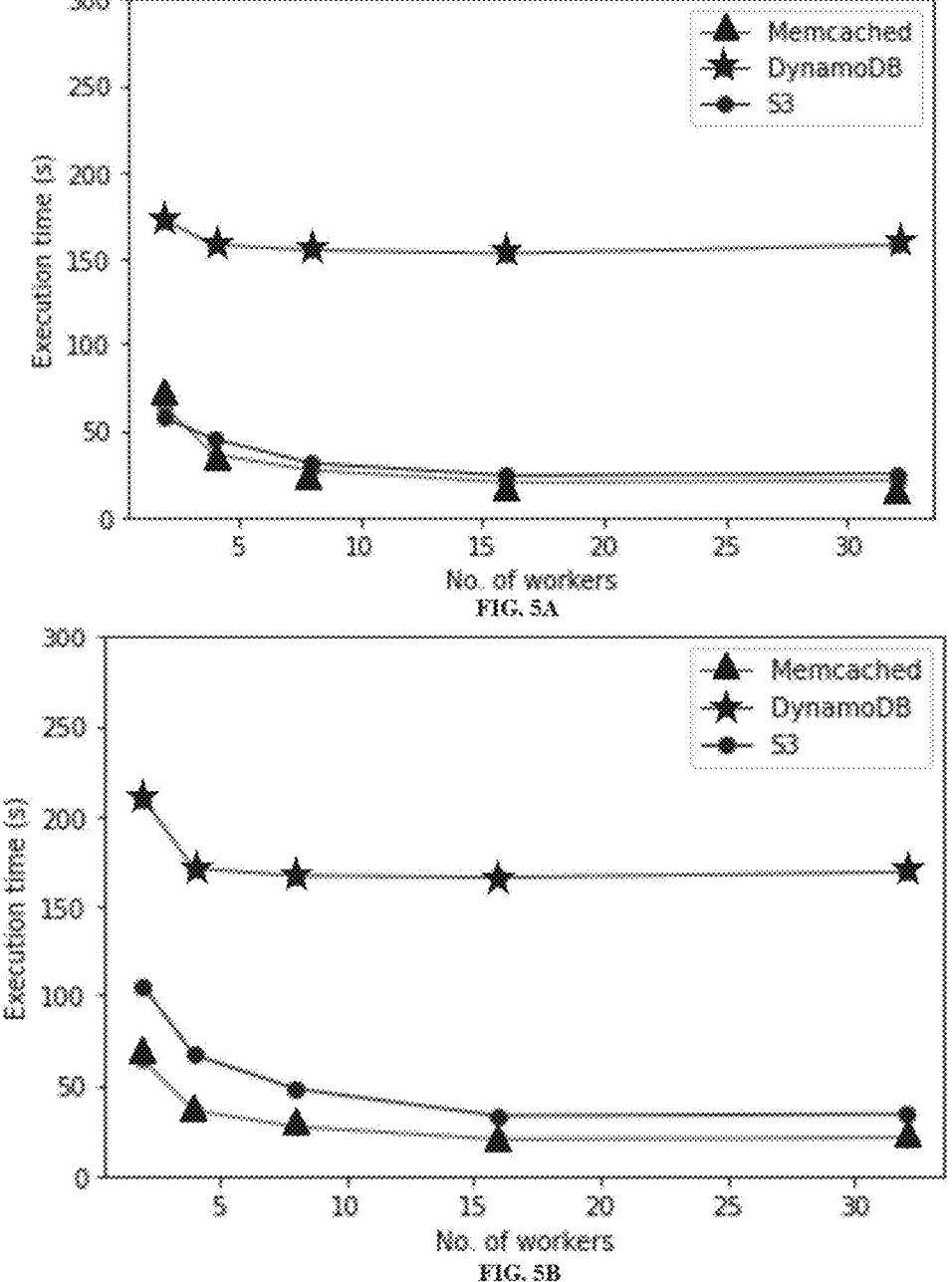
FIGS. 5A through 5C illustrate comparative results of execution time for completing specified number of mini-batches of training for multiple DL models with increasing number of workers spawned in the serverless architecture across multiple communication channels, in accordance with some embodiments of the present disclosure.
Figure 5C:
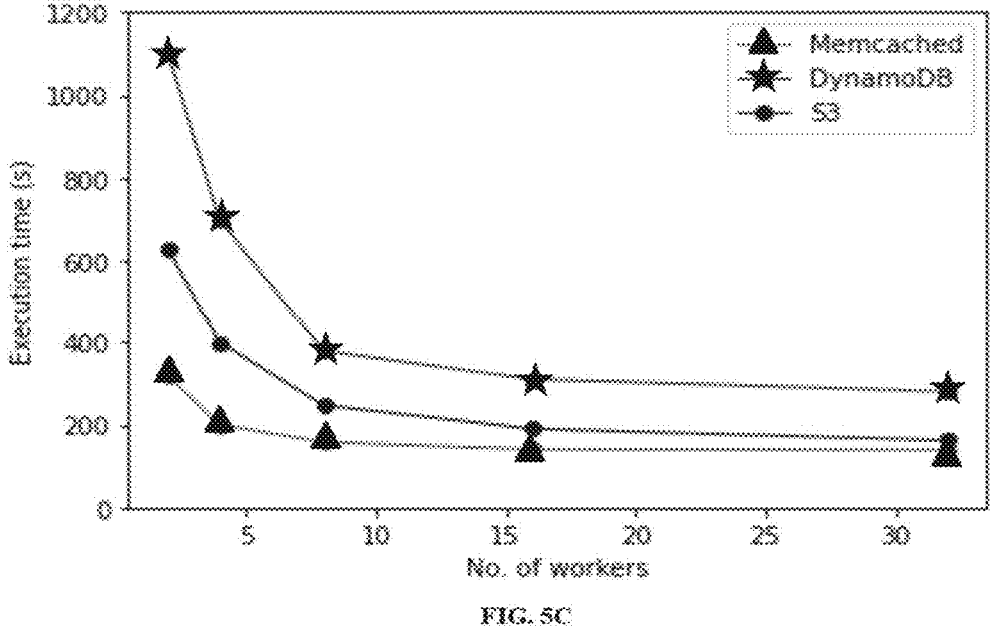
Figures 7A, 7B:
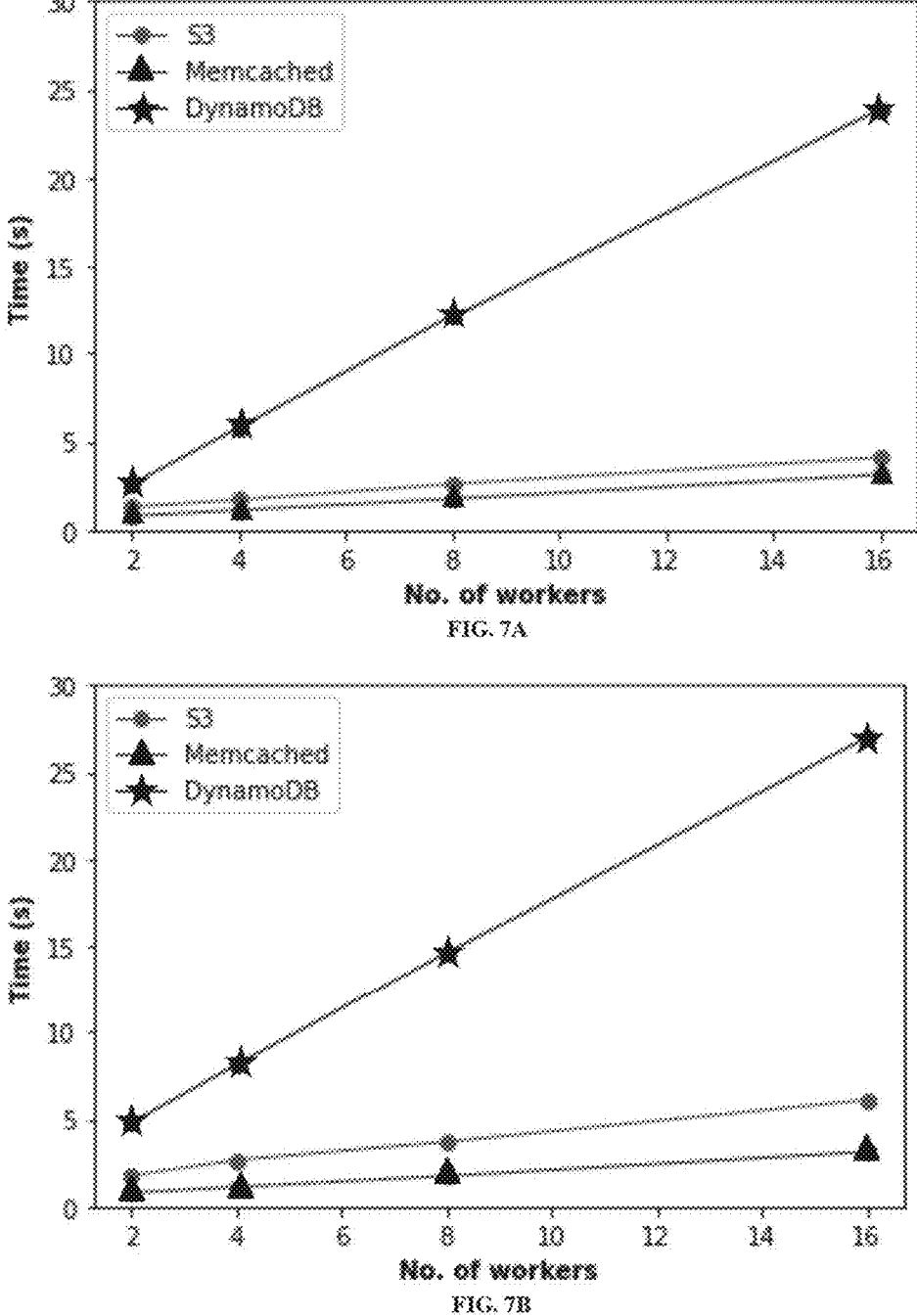
FIGS. 7A through 7C illustrate comparative results of communication overhead during of training for multiple DL models with increasing number of workers spawned in the serverless architecture across multiple communication channels, in accordance with some embodiments of the present disclosure.
Figures 7C, 8A:
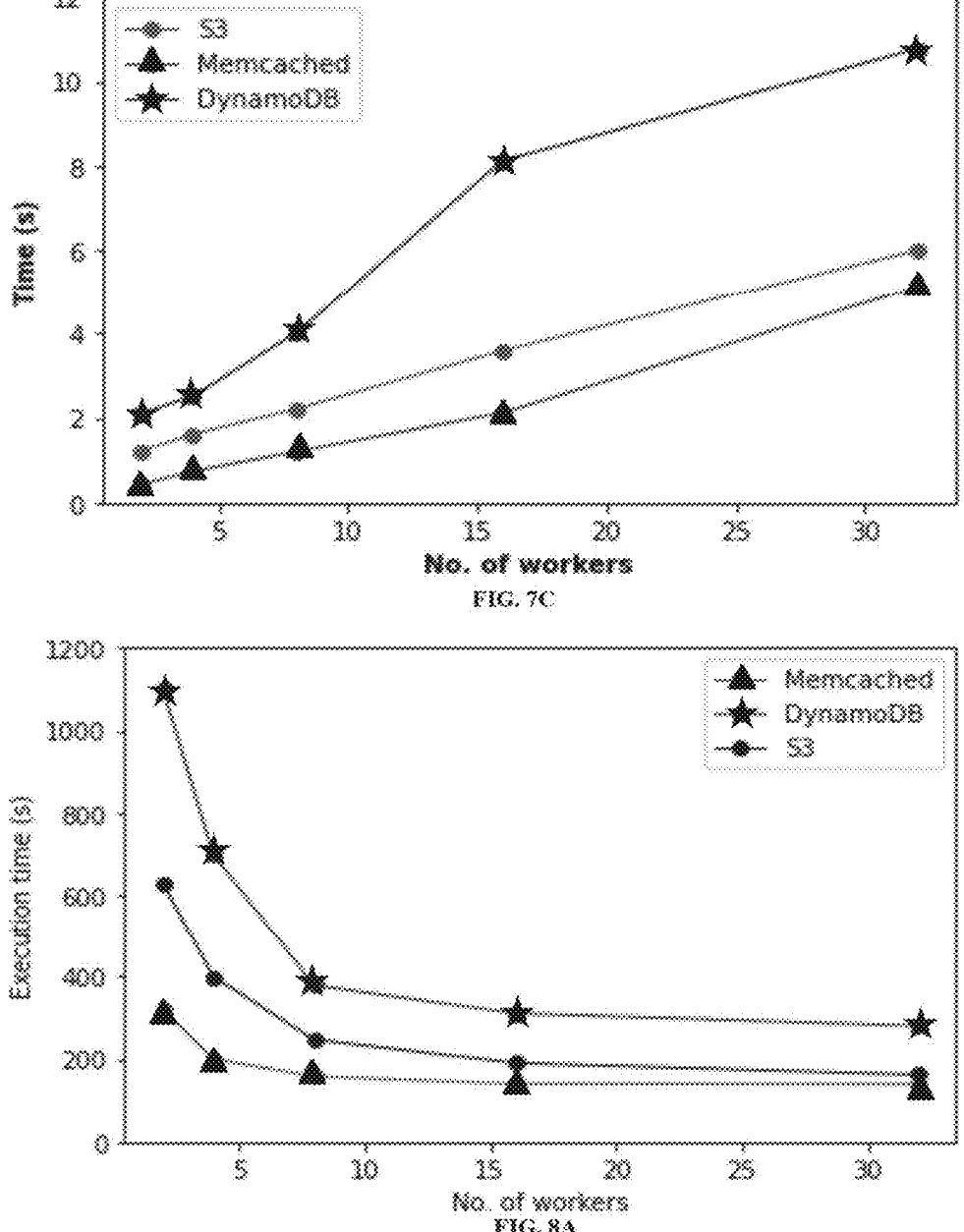
FIGS. 8A through 8C illustrate evaluation of an analytical model across multiple DL models being trained, in accordance with some embodiments of the present disclosure.

Communication overhead: The communication overhead observed with the three communication channels, i.e., S3, Memcached, and our implementation with DynamoDB is compared. The communication overhead due to one update includes communication channel, (b) read by the master aggregator once the gradients are received from all the workers, (c) save merged gradients to the channel, and (d) send merged gradients to all the workers. FIGS. 7A, 7B and 7C shows the communication overhead for one update. DynamoDB results in the highest latency, followed by S3 and Memcached. The latency increases as the number of workers increase. For a given number of workers with any communication channel, larger models show higher latency. The Memcached are in-memory stores and hence the fastest among all three communication channels. Although the communication overhead increases but total execution time decrease with increasing number of workers as shown in FIGS. 5A, 5B and 5C.

Figures 8B, 8C:
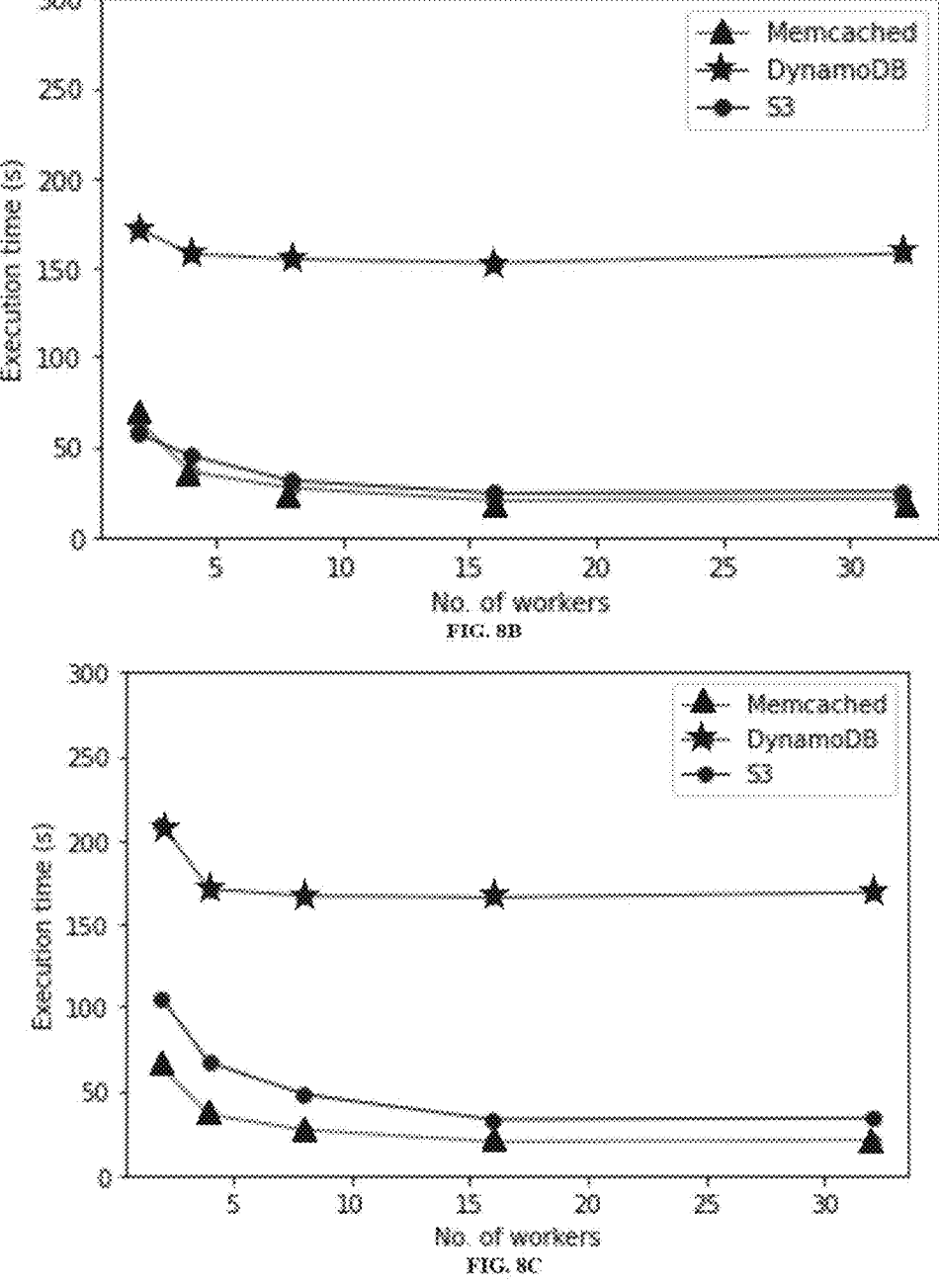

Comparison of analytical and empirical data: FIGS. 8A, 8B and 8C shows the comparison of the execution time calculated using the analytical model and experimental data for one epoch with a varying number of workers. The total execution time predicted by the analytical model using the constants given in the table II approximates the experimental data well.

Figures 9A, 9B:
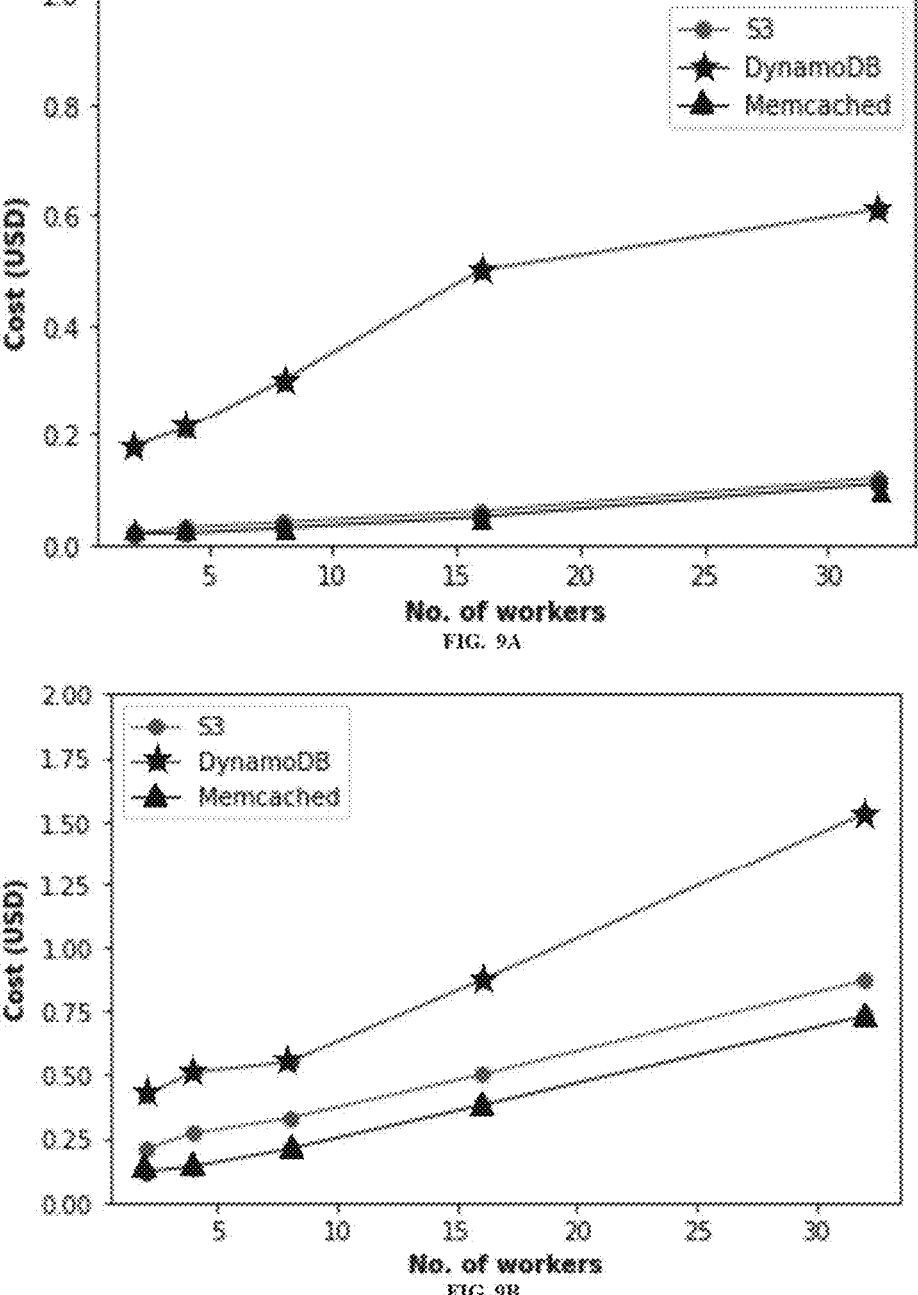
FIGS. 9A and 9B illustrate computed cost of training of multiple DL models across multiple communication channels using the analytical model, in accordance with some embodiments of the present disclosure.

Cost: Each communication channel used in the evaluation has a unique cost model. The total cost of implementation depends on the number of reads and writes, size of the data transferred, number of Lambda instances used and their configuration such as memory size, and the fixed cost of the communication channel. As shown in FIGS. 9A and 9B, Memcached cost the least. As observed in experiments discussed above, Memcached appears to outperform S3 and DynamoDB. However, the overall cost of Memcached is larger than S3 and comparable to DynamoDB because it takes more than 2 minutes to start the Memcached cluster whereas S3 and DynamoDB (pay-per-use) are instant.

Figures 10A, 10B:
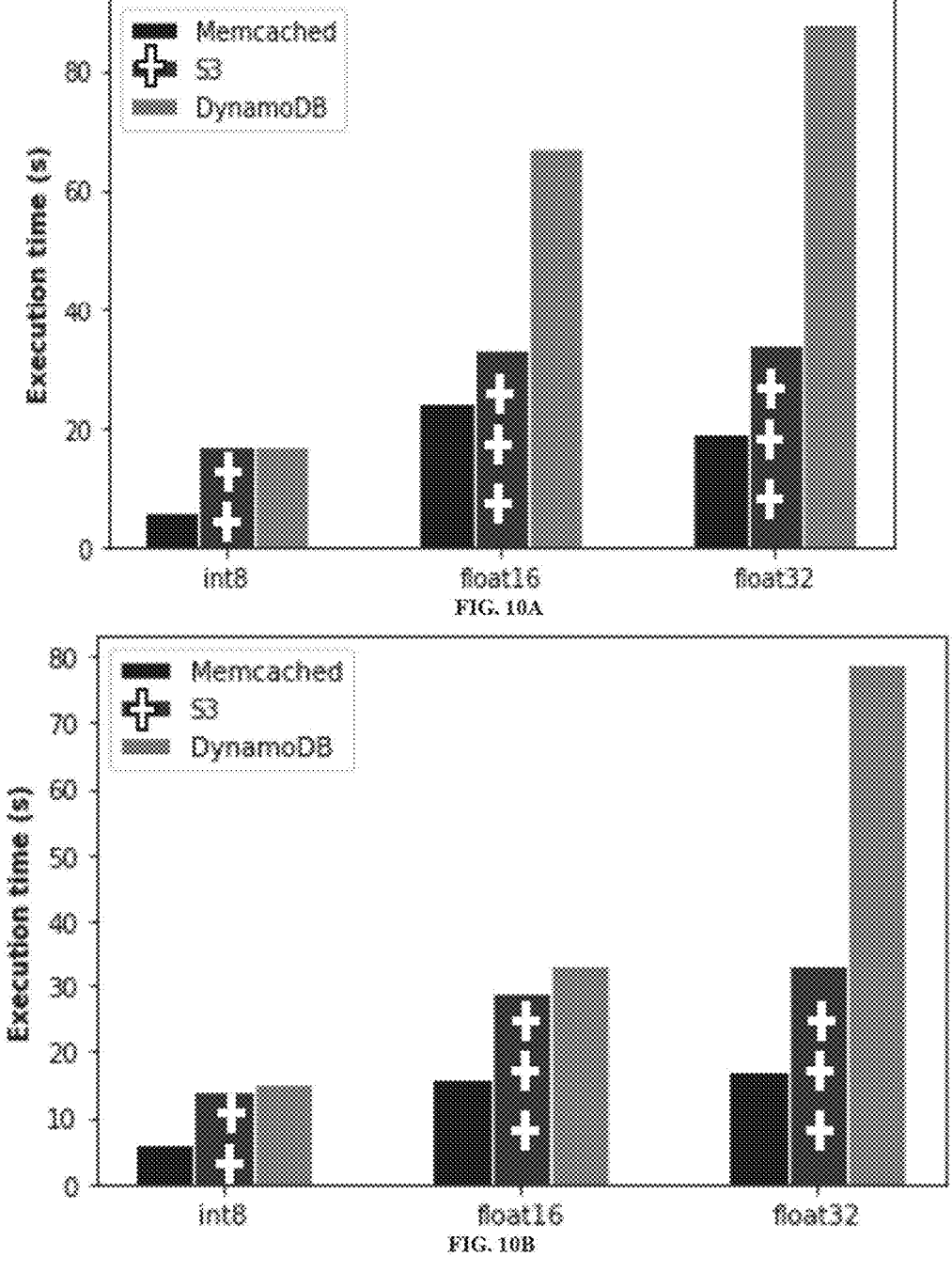
FIGS. 10A and 10B illustrate effect of gradient data type on execution time computed using the analytical model in accordance with some embodiments of the present disclosure.

Effect of optimization techniques: FIGS. 10A and 10B depict the effect of changing the data type of gradient vectors on the execution time of the workloads. In comparison to the float32 gradient data type, the int8 datatype of gradient vectors shows an improvement of 3.1×, 2×, and 5.2× in the execution time of 80 mini-batches using Memcached, 53, and DynamoDB, respectively. FIGS. 11A and 11B shows the effect of using multiple aggregators for gradient aggregation on communication overhead and hence the total execution time with DynamoDB. This figure shows a reduction of 1.2×, 1.8×, 2.2× for NISER and 1.5×, 1.5×1.7× for Mobile-Net using int8, float16, and float32 data types.

Based on our experimental evaluation, it can be concluded that large deep learning models can be trained using serverless architecture with data management services especially databases where there are constraints on the size of the data item to store. Optimization techniques help improve the performance and cost of serverless training using data storage services by reducing the communication overhead.

Thus, the system and method disclosed herein provide a framework and a technique for distributed deep learning using serverless platforms and communication channels available on cloud. Specifically, when the gradients of models are larger than the data item size of the data storage used as communication channel. Optimization techniques are provided to mitigate the communication overhead due to the frequent sharing of model updates between the serverless instances (peers) in a distributed environment. The optimization techniques such as multi-threading, multiple aggregators, data types etc. with communication channels results in a significant improvement in the performance and the cost of training.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for training large Deep Learning (DL) models using a serverless architecture, the method comprising:

spawning, by one or more hardware processors, a plurality of serverless instances defining a plurality of workers; and training a DL model by the plurality of workers executed by the one or more hardware processors, by partitioning a training data among the plurality of workers, wherein the partitioned training data split into a plurality of mini batches is utilized sequentially during iterative execution of a plurality of training instances, until the plurality of mini batches are exhausted; the iterative execution of the plurality of training instances comprising:

initiating a current training instance among the plurality of training instances by each of the plurality of workers using a current mini-batch among the plurality of mini batches and generating a plurality of trained local DL models;

chunking, by each of the plurality of workers, each of the plurality of trained local DL models into a plurality of segments based on a model size of each of the plurality of trained local DL models and a maximum size of one data item allowed in a cloud storage services-based communication channel;

writing, the plurality of segments corresponding to each of the plurality of trained local DL models to the cloud storage services-based communication channel in accordance with the maximum size of one data item allowed in the cloud storage services-based communication channel;

aggregating, by one or more aggregators, corresponding segments of each of the plurality of segments of each of the plurality of trained local DL models to generate a plurality of aggregated segment level DL models;

writing the plurality of aggregated segment level DL models into the cloud storage services-based communication channel; and concurrently reading and concatenating, the plurality of aggregated segment level DL models by each of the plurality of workers to obtain an aggregated model generated by the current training instance, wherein the aggregated model is used by each of the plurality of workers during the successive training instances using a successive mini batch.

2. The method of claim 1, wherein communication between the plurality of workers and the cloud storage services-based communication channel is accelerated by using one or more optimization techniques, comprising:

utilizing a plurality of tables for storing the plurality of segments of each of the plurality of local models, when the cloud storage based communication channel is a database storage, utilizing the plurality of aggregators that read and write to the cloud storage services-based communication channel concurrently, reducing communication overhead, writing the plurality of segments corresponding to each of the plurality of trained local DL models to the cloud services-based communication channel by creating batches of the plurality of segments and using multiple threads within each worker transfers the batches in parallel to the cloud storage services-based communication channel, and wherein multiple threads can leverage multiple cores available on each of the plurality of serverless instances, and reducing number of the plurality of segments created for each of the plurality of trained local DL models by converting data elements of each of the plurality of trained local DL models to float16 and int8 based on the DL model and value of range of the trained local DL model.

3. The method of claim 2, wherein the cloud storage services-based communication channel enables the plurality of workers to write the plurality of segments corresponding to each of the plurality of trained local DL models in parallel and read the plurality of aggregated segment level DL models in parallel and creates a number of homogeneous storage units equal to number of the plurality of workers, wherein each of the plurality of workers concurrently writes one or more segments per homogenous storage unit.

4. The method of claim 1, wherein the one or more aggregators are identified from the plurality of workers.

5. The method as claimed in claim 1, wherein a cost of training of the DL model is provided by an analytical model that computes the cost in terms of communication time $T_c$ based on size of each of the plurality of segments of each of the plurality of local DL models, a number of concurrent read and write threads, and maximum allowed batch size in accordance with the maximum size of one data item of the cloud storage based communication channel.

6. A system for training large Deep Learning (DL) models, the system comprising:

a memory storing instructions;

one or more Input/Output (I/O) interfaces; and one or more hardware processors coupled to the memory via the one or more I/O interfaces, wherein the one or more hardware processors are configured by the instructions to:

spawn a plurality of serverless instances defining a plurality of workers; and train a DL model via the plurality of workers, by partitioning a training data among the plurality of workers, wherein the partitioned training data split into a plurality of mini batches is utilized sequentially during iterative execution of a plurality of training instances, until the plurality of mini batches are exhausted, the iterative execution of the plurality of training instances comprising:

initiating a current training instance from among the plurality of training instances by each of the plurality of workers using a current mini-batch among the plurality of mini batches and generating a plurality of trained local DL models;

chunking, by each of the plurality of workers, each of the plurality of trained local DL models into a plurality of segments based on a model size of each of the plurality of trained local DL models and a maximum size of one data item allowed in a cloud storage services-based communication channel;

writing, the plurality of segments corresponding to each of the plurality of trained local DL models to the cloud storage services-based communication channel in accordance with the maximum size of one data item allowed in the cloud storage services-based communication channel;

aggregating, by one or more aggregators, corresponding segments of each of the plurality of segments of each of the plurality of trained local DL models to generate a plurality of aggregated segment level DL models;

writing, by one or more aggregators, the plurality of aggregated segment level DL models into the cloud storage services-based communication channel; and concurrently reading and concatenating, the plurality of aggregated segment level DL models by each of the plurality of workers to obtain an aggregated model generated by the current training instance, wherein the aggregated model is used by each of the plurality of workers during the successive training instances using a successive mini batch.

7. The system of claim 6, wherein the one or more hardware processors are configured to accelerate communication between the plurality of workers and the cloud storage services-based communication channel by using one or more optimization techniques, comprising:

utilizing a plurality of tables for storing the plurality of segments of each of the plurality of local models, when the cloud storage based communication channel is a database storage, utilizing the plurality of aggregators that read and write to the cloud storage services-based communication channel concurrently, reducing communication overhead, writing the plurality of segments corresponding to each of the plurality of trained local DL models to the cloud services-based communication channel by creating batches of the plurality of segments and using multiple threads within each worker transfers the batches in parallel to the cloud storage services-based communication channel, and wherein multiple threads can leverage multiple cores available on each of the plurality of serverless instances, and reducing number of the plurality of segments created for each of the plurality of trained local DL models by converting data elements of each of the plurality of trained local DL models to float16 and int8 based on the DL model and value of range of the trained local DL model.

8. The system of claim 6, wherein the cloud storage services-based communication channel enables the plurality of workers to write the plurality of segments corresponding to each of the plurality of trained local DL models in parallel and read the plurality of aggregated segment level DL models in parallel and creates a number of homogeneous storage units equal to number of the plurality of workers, wherein each of the plurality of workers concurrently writes one or more segments per homogenous storage unit.

9. The system of claim 6, wherein the one or more aggregators are identified from the plurality of workers.

10. The system of claim 6, wherein the one or more hardware processors are configured to compute a cost of training of the DL model vis an analytical model that computes the cost in terms of communication time $T_c$ based on size of each of the plurality of segments of each of the plurality of local DL models, a number of concurrent read and write threads, and maximum allowed batch size in accordance with the maximum size of one data item of the cloud storage based communication channel.

11. One or more non-transitory machine-readable information storage mediums comprising one or more instructions which when executed by one or more hardware processors cause:

spawning a plurality of serverless instances defining a plurality of workers; and training a DL model by the plurality of workers executed by one or more hardware processors, by partitioning a training data among the plurality of workers, wherein the partitioned training data split into a plurality of mini batches is utilized sequentially during iterative execution of a plurality of training instances, until the plurality of mini batches are exhausted, the iterative execution of the plurality of training instances comprising:

initiating a current training instance among the plurality of training instances by each of the plurality of workers using a current mini-batch among the plurality of mini batches and generating a plurality of trained local DL models;

chunking by each of the plurality of workers, each of the plurality of trained local DL models into a plurality of segments based on a model size of each of the plurality of trained local DL models and a maximum size of one data item allowed in a cloud storage services-based communication channel;

writing the plurality of segments corresponding to each of the plurality of trained local DL models to the cloud storage services-based communication channel in accordance with the maximum size of one data item allowed in the cloud storage services-based communication channel;

aggregating by one or more aggregators, corresponding segments of each of the plurality of segments of each of the plurality of trained local DL models to generate a plurality of aggregated segment level DL models;

writing the plurality of aggregated segment level DL models into the cloud storage services-based communication channel; and concurrently reading and concatenating the plurality of aggregated segment level DL models by each of the plurality of workers to obtain an aggregated model generated by the current training instance, wherein the aggregated model is used by each of the plurality of workers during the successive training instances using a successive mini batch.

12. The one or more non-transitory machine-readable information storage mediums of claim 11, wherein communication between the plurality of workers and the cloud storage services-based communication channel is accelerated by using one or more optimization techniques, comprising, utilizing a plurality of tables for storing the plurality of segments of each of the plurality of local models, when the cloud storage based communication channel is a database storage, utilizing the plurality of aggregators that read and write to the cloud storage services-based communication channel concurrently, reducing communication overhead, writing the plurality of segments corresponding to each of the plurality of trained local DL models to the cloud services-based communication channel by creating batches of the plurality of segments and using multiple threads within each worker transfers the batches in parallel to the cloud storage services-based communication channel, and wherein multiple threads can leverage multiple cores available on each of the plurality of serverless instances, and reducing number of the plurality of segments created for each of the plurality of trained local DL models by converting data elements of each of the plurality of trained local DL models to float16 and int8 based on the DL model and value of range of the trained local DL model.

13. The one or more non-transitory machine-readable information storage mediums of claim 11, wherein the cloud storage services-based communication channel enables the plurality of workers to write the plurality of segments corresponding to each of the plurality of trained local DL models in parallel and read the plurality of aggregated segment level DL models in parallel and creates a number of homogeneous storage units equal to number of the plurality of workers, and wherein each of the plurality of workers concurrently writes one or more segments per homogenous storage unit.

14. The one or more non-transitory machine-readable information storage mediums of claim 11, wherein the one or more aggregators are identified from the plurality of workers.

15. The one or more non-transitory machine-readable information storage mediums of claim 11, wherein a cost of training of the DL model is provided by an analytical model that computes the cost in terms of communication time $T_c$ based on size of each of the plurality of segments of each of the plurality of local DL models, a number of concurrent read and write threads, and maximum allowed batch size in accordance with the maximum size of one data item of the cloud storage based communication channel.

* * * * *